United States Patent
Ohmori et al.

(10) Patent No.: US 8,453,559 B2
(45) Date of Patent: Jun. 4, 2013

(54) PISTON

(75) Inventors: Kenichi Ohmori, Saitama (JP); Kazuyuki Nakai, Saitama (JP); Akifumi Nomura, Saitama (JP); Kazuya Tanabe, Saitama (JP); Satoshi Ino, Saitama (JP); Shinichi Wagatsuma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 847 days.

(21) Appl. No.: 12/615,823

(22) Filed: Nov. 10, 2009

(65) Prior Publication Data

US 2010/0139480 A1  Jun. 10, 2010

(30) Foreign Application Priority Data

Dec. 5, 2008 (JP) ................................ 2008-310453

(51) Int. Cl.
*F16J 1/04* (2006.01)
(52) U.S. Cl.
USPC ............................................................ 92/239
(58) Field of Classification Search
USPC ................... 92/239, 234, 235, 236, 237, 208
See application file for complete search history.

(56) References Cited

U.S. PATENT DOCUMENTS

| | | | | |
|---|---|---|---|---|
| 1,363,725 A | * | 12/1920 | Flammang | 92/217 |
| 2,147,956 A | * | 2/1939 | Alexandrescu | 92/160 |
| 4,674,399 A | * | 6/1987 | Bruni | 92/158 |
| 8,042,453 B2 | * | 10/2011 | Azevedo | 92/237 |

FOREIGN PATENT DOCUMENTS

| | | |
|---|---|---|
| JP | 6-330813 A | 11/1994 |
| JP | 2001-289117 A | 10/2001 |
| JP | 2007-309271 A | 11/2007 |

* cited by examiner

*Primary Examiner* — Edward Look
*Assistant Examiner* — Logan Kraft
(74) *Attorney, Agent, or Firm* — Birch, Stewart, Kolasch & Birch, LLP

(57) ABSTRACT

A piston with transverse-rib through holes formed easily therein for reducing the cost of manufacturing. A piston includes a pair of mutually opposed longitudinal ribs individually formed with piston pin bosses interconnecting a pair of piston skirt portions on a back side of a piston head. A pair of transverse ribs interconnect the mutually opposed longitudinal ribs with the transverse ribs. The pair of transverse ribs are formed with transverse-rib through holes at places proximal to the back side of the piston head. A skirt opening is formed by cutting away a part of the piston skirt portion that is opposed to the transverse rib and faces the transverse-rib through hole.

20 Claims, 5 Drawing Sheets

PISTON

CROSS-REFERENCE TO RELATED APPLICATIONS

The present application claims priority under 35 USC 119 to Japanese Patent Application No. 2008-310453 filed on Dec. 5, 2008 the entire contents of which are hereby incorporated by reference.

BACKGROUND OF THE INVENTION

1. Field of the Invention

The present invention relates to a piston connected with a connecting rod by means of a piston pin with the piston being reciprocally moved in a cylinder.

2. Description of Background Art

A piston crank mechanism of an internal combustion engine is generally arranged as follows. Mutually opposed piston pin bosses project from a back side of a piston head of the piston that is reciprocally moved within the cylinder. The piston pin is inserted through coaxial pin holes of the piston pin bosses. A smaller end of the connecting rod is coupled to a central portion of the piston pin supported on the opposite ends thereof.

As seen from the above, the piston has a pair of mutually opposed piston pin bosses projecting from the back side of the piston head. When a blast load due to combustion in the operating internal combustion engine is exerted on a top surface of the piston, a piston with a short piston skirt portions, in particular, tends to suffer deformation of the piston head such that lower ends of the paired piston pin bosses are spaced away from each other. The deformed piston head interferes with a smooth reciprocal movement of the piston.

A piston is known wherein ribs project from the back side of the piston head in order to ensure a required rigidity of the piston. See, for example, JP-A No. 2007-309271.

In the piston disclosed in JP-A No. 2007-309271, mutually opposed longitudinal ribs (first, second side walls) are individually formed with the piston pin bosses interconnect the opposed piston skirt portions on the back side of the piston head with a pair of transverse ribs (first, second connecting portions) interconnect the mutually opposed longitudinal ribs. Thus, the piston ensures the required rigidity.

The transverse rib is a wall to interconnect the mutually opposed longitudinal ribs that has a short connecting length and does not constitute a large part. Accordingly, the transverse rib does not have so much weight. However, the transverse rib, which extends from the back side of the piston head, places an unwanted weight load on the piston which seeks to achieve the greatest possible weight reduction for reducing inertial mass. On this account, the piston disclosed in JP-A No. 2007-309271 is provided with transverse-rib through holes (void portions) at places so close to the back side of the piston head so as not to affect the rigidity of the transverse ribs so much.

Further, the transverse-rib through holes in the transverse ribs interconnecting the longitudinal ribs are useful in increasing an oil cooling effect of the piston by facilitating uniform oil adhesion to the back side of the piston head.

As seen from a back side of the piston, the transverse-rib through hole of the transverse rib is formed deep down at a place proximal to the back side of the piston head and is enclosed by the piston skirt portion, the pair of longitudinal ribs and the other transverse rib. It is therefore difficult to form the transverse-rib through hole by cutting the transverse rib with a tool inserted from an under side of the piston head.

According to JP-A No. 2007-309271, insert cores are laid at places corresponding to the transverse-rib through holes so as to cast the transverse-rib through holes when the piston is formed by casting.

In the case where the piston is cast using such insert cores, casting dies include many component members and become complicated, resulting in an increased die cost. What is more, a die releasing operation involves an additional step to remove the cores, which results in an increase in cost.

SUMMARY AND OBJECTS OF THE INVENTION

According to an embodiment of the present invention, a piston is adapted to reduce a cost increase and to facilitate the forming of the transverse-rib through holes.

According to an embodiment of the present invention, a pair of mutually opposed longitudinal ribs are individually formed with piston pin bosses for interconnecting mutually opposed piston skirt portions on a back side of a piston head. A pair of transverse ribs interconnect the mutually opposed longitudinal ribs. The transverse ribs are formed with transverse-rib through holes at places proximal to the back side of the piston head with a skirt opening being formed by cutting away a part of the piston skirt portion that is opposed to the transverse rib and that faces the transverse-rib through hole.

According to an embodiment of the present invention, the skirt opening is a hole-like cut-away portion formed by cutting a hole through the piston skirt portion.

According to an embodiment of the present invention, the skirt opening is a cut-away portion formed by cutting away a part of the piston skirt portion from a distal end thereof.

According to an embodiment of the present invention, an opening area of the skirt opening is larger than or equal to an opening area of the transverse-rib through hole.

According to an embodiment of the present invention, when the piston is cast, the skirt opening and the through hole are simultaneously cast using a common slide core.

According to an embodiment of the present invention, the skirt openings are simultaneously cast when the piston is cast, and that cutting blades are inserted from outside through the formed skirt openings for cutting the transverse-rib through holes at required places of the transverse ribs.

According to an embodiment of the present invention, the pair of mutually opposed longitudinal ribs individually formed with the piston pin bosses interconnect the mutually opposed piston skirt portions on the back side of the piston head with the pair of transverse ribs interconnecting the mutually opposed longitudinal ribs. The transverse ribs are formed with the transverse-rib through holes at places proximal to the back side of the piston head with the skirt opening being formed by cutting away the part of the piston skirt portion that is opposed to the transverse rib and that faces the transverse-rib through hole. Hence, the advantage of the skirt opening is taken to set the common slide core so as to cast the transverse-rib through hole along with the skirt opening. Alternatively, a cutting blade is inserted through the skirt opening for cutting the transverse-rib through hole. In either case, the transverse-rib through hole can be formed easily by a smaller number of working steps than in the casting using the insert cores. Thus, an increase in the manufacturing cost of the piston is reduced.

In addition, the weight of the piston is reduced by forming the skirt openings in the piston skirt portions so that the inertial mass of the piston is reduced even further.

According to an embodiment of the present invention, the skirt opening is the hole-like cut-away portion formed by cutting the hole through the piston skirt portion. It is only necessary to form in the pin skirt portion a minimum necessary hole-like cut-away portion for permitting the forming of the transverse-rib through hole. Thus, the piston can ensure a sufficient rigidity.

According to an embodiment of the present invention, the skirt opening is the cut-away portion formed by cutting away the part of the piston skirt portion from the distal end thereof. The cut-away portion is formed in a relatively larger area so as to facilitate the cutting of the transverse-rib through hole. In addition, the weight of the piston is reduced further to achieve an even greater reduction of the inertial mass.

According to an embodiment of the present invention, the opening area of the skirt opening is larger than or equal to the opening area of the transverse-rib through hole. This provides for an easy cutting of the transverse-rib through hole via the skirt opening.

According to an embodiment of the present invention, the skirt opening and the transverse-rib through hole are simultaneously cast using the common slide core when the piston is cast. Thus, the component members of the casting dies and the number of working steps are reduced to achieve a reduction in the manufacturing cost.

According to an embodiment of the present invention, the skirt openings are simultaneously cast when the piston is cast and the cutting blades are inserted from outside through the formed skirt openings for cutting the transverse-rib through holes at the required places of the transverse ribs. This results in the further reduction of the component members of the casting dies and the number of working steps, providing for the easy cutting of the transverse-rib through holes via the skirt openings. Thus, the number of processing steps is reduced to achieve a reduction in the manufacturing costs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
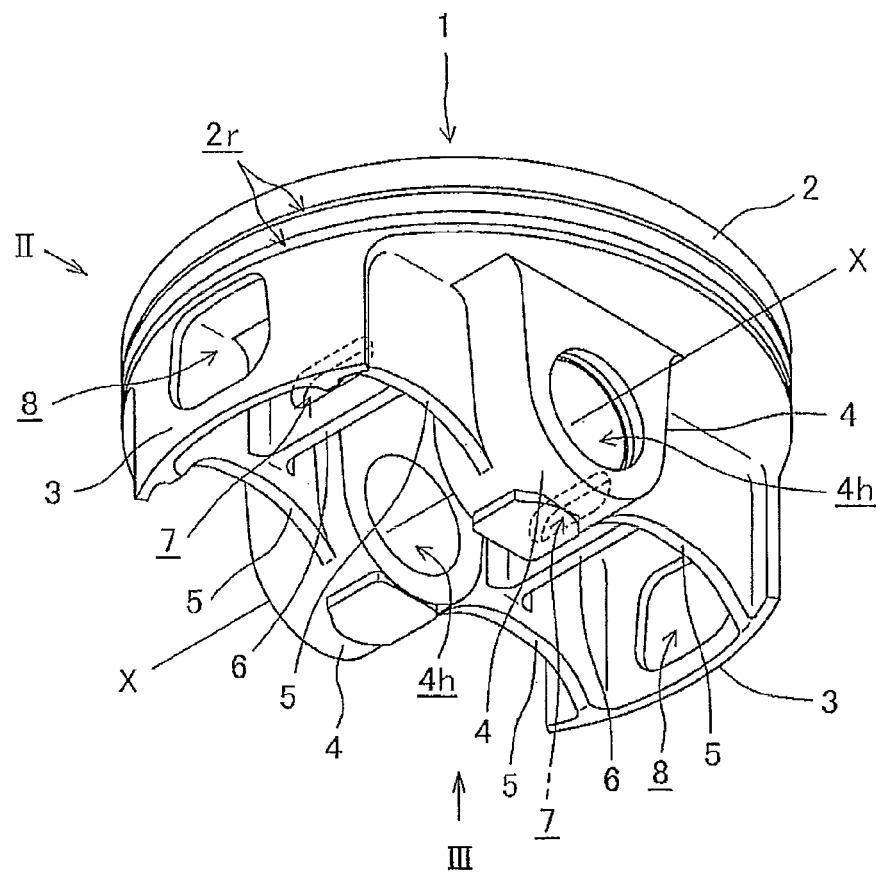
FIG. 1 is a perspective view of a piston according to one embodiment of the invention as obliquely viewed from below.
Figure 2:
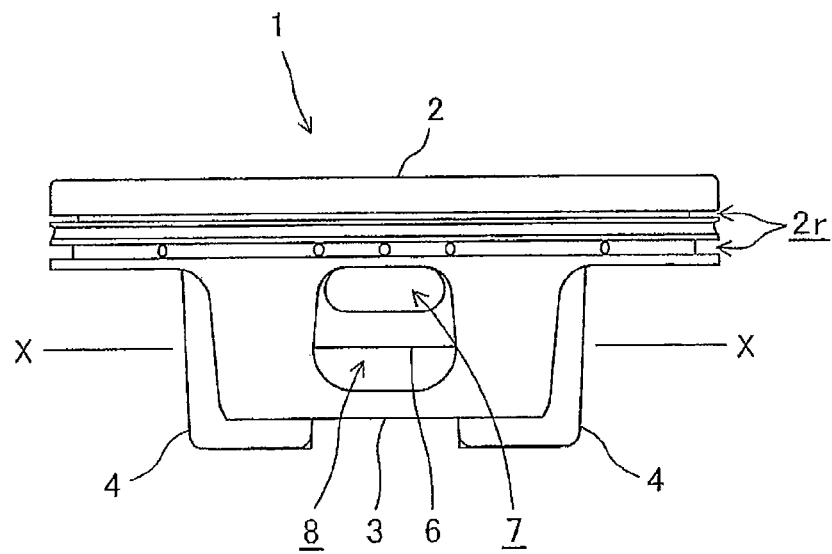
FIG. 2 is a front elevation of the piston (a view taken along the arrowed line II in FIG. 1)
Figure 3:
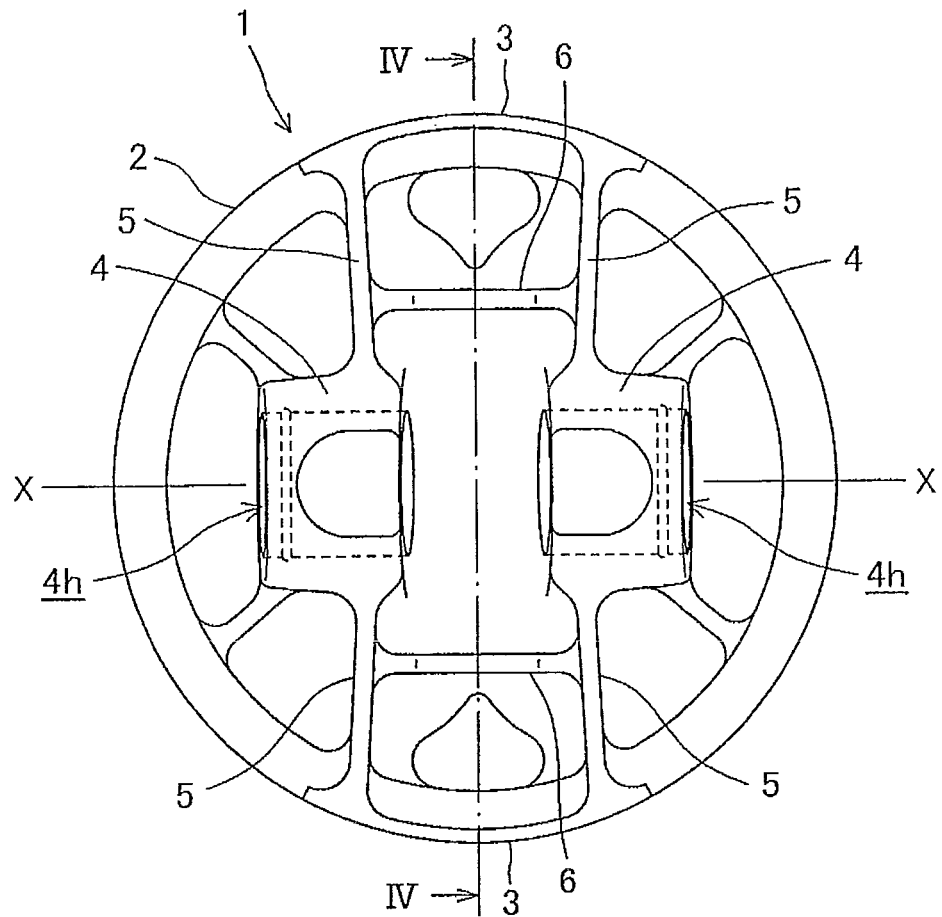
FIG. 3 is a rear view of the piston (a view taken along the arrowed line III in FIG. 1)

A first embodiment of the invention will be hereinbelow described with reference to FIG. 1 to FIG. 5 wherein a piston 1 is reciprocally moved in a cylinder of an internal combustion engine. The piston is connected with a connecting rod by means of a piston pin.

The piston 1 includes: a piston head 2 having a piston top surface on a combustion chamber side; a piston skirt 3 defined by an outer periphery of the piston head 2 which extends from a back side thereof; and a pair of piston pin bosses 4, 4 projecting from the back side of the piston head 2. The piston skirt 3 is cut away at portions where the piston pin bosses 4, 4 are opposed to each other, symmetrically defining a pair of piston skirt portions 3, 3 opposed to each other.

The piston head 2 is formed with a ring groove 2r on the outer periphery thereof.

The mutually opposed piston pin bosses 4, 4 are coaxially formed with circular pin holes 4h, 4h through which a piston pin (not shown) is inserted.

The pair of piston skirt portions 3, 3 is formed at places symmetrical with respect to the center axis X-X of the pin holes 4h, 4h.

On the back side of the piston head 2, the mutually opposed piston skirt portions 3, 3 are interconnected by a pair of longitudinal ribs 5, 5 symmetrically projecting as opposed to each other.

The longitudinal ribs 5, 5 are walls perpendicular to the center axis X-X of the pin holes 4h, 4h.

The pair of longitudinal ribs 5, 5 are individually formed with the piston pin bosses 4, 4 which protrude centrally thereof.

A pair of transverse ribs 6, 6 is formed at places symmetrical with respect to the center axis X-X. The paired transverse ribs 6, 6 interconnect the pair of longitudinal ribs 5, 5 and extend in parallel to the center axis X-X and project from the back side of the piston head 2.

The transverse ribs 6, 6 are opposed to the piston skirt portions 3, 3, respectively. The transverse ribs project from the back side of the piston head 2 substantially as much as the longitudinal ribs 5, 5 but not so much as the piston skirt portions 3, 3.

The piston 1 is constructed such that the pair of transverse ribs 6, 6 interconnects the pair of mutually opposed longitudinal ribs 5, 5 which interconnect the piston skirt portions 3, 3 projecting from the back side of the piston head 2. Therefore, the piston 1 has such a high rigidity so as to withstand deformation of the piston head 2, in particular, which is caused by a blast load exerted on the piston top surface due to combustion in the operating internal combustion engine.

The transverse ribs 6, 6 are formed with horizontally elongated transverse-rib through holes 7, 7 at places proximal to the back side of the piston head 2.

The weight of the piston 1 can be reduced by forming the transverse-rib through holes 7, 7 in the transverse ribs 6, 6 so as to reduce the inertial mass. Furthermore, the transverse-rib through holes 7, 7 permit oil to pass therethrough thereby facilitating uniform oil adhesion to the back side of the piston head 2. Thus, the piston can achieve an increased oil cooling effect.

The piston skirt portions 3 of the piston 1 each include a skirt opening 8 formed by cutting a substantially rectangular hole which is opposed to the transverse rib 6 and which faces the transverse-rib through hole 7.

An opening area of the skirt opening 8 is larger than that of the transverse-rib through hole 7. As seen in the front elevation of the piston 1 shown in FIG. 2, the transverse-rib through hole 7 faces the skirt opening 8 as shifted to a place corresponding to an upper part of the skirt opening 8. The transverse-rib through hole 7 at the back of the skirt opening can be seen through the skirt opening 8.

The piston 1 is reduced in the weight by providing the skirt openings 8 at the piston skirt portions 3 whereby the inertial mass of the piston is reduced even further.

The skirt opening 8 is a hole-like cut-away portion formed by cutting a hole through the piston skirt portion 3 so that a lower end of the piston skirt portion 3 extends continuously. Therefore, if the blast load is exerted on the piston top surface, the piston skirt portions can cooperate with the transverse ribs 6, 6 to maintain a sufficient rigidity for resisting even such a deformation that the lower ends of the piston pin bosses 4, 4 are spaced away from each other.

The piston 1 having the above structure is formed by casting.

Figure 4:
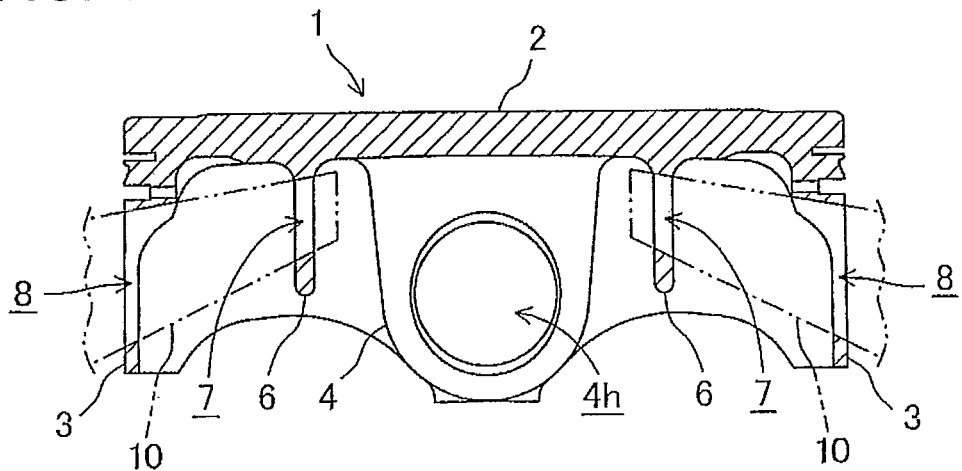
FIG. 4 is a sectional view of the piston (a sectional view taken on the line IV-IV in FIG. 3)

The transverse-rib through hole 7 of the transverse rib 6 interconnecting the longitudinal ribs 5, 5 is a part difficult to process or cast because the transverse-rib through hole 7 is formed deep down at a place proximal to the back side of the piston head 2 and is enclosed by the piston skirt portion 3 on an outer side thereof, the longitudinal ribs 5, 5 on either side thereof and the other transverse rib 6 on an inner side thereof. However, the piston 1 is provided with the skirt opening 8 at the piston skirt portion 3, which has the larger opening area than the transverse-rib through hole 7 and which is located opposite the transverse-rib through hole 7 as seen in the front elevation. As shown in FIG. 4, therefore, the skirt openings 8 and the transverse-rib through holes 7 having the smaller opening area can be formed simultaneously by inserting common slide cores (represented by chain double-dashed lines in FIG. 4) through the skirt openings 8 and the transverse-rib through holes 7 when the piston 1 is cast.

Thus, the transverse-rib through hole 7 can be easily cast in parallel with the skirt opening 8 by a smaller number of working steps than in a past casting process using insert cores. Thus, an increase in the manufacturing cost of the piston 1 is reduced.

Figure 5:
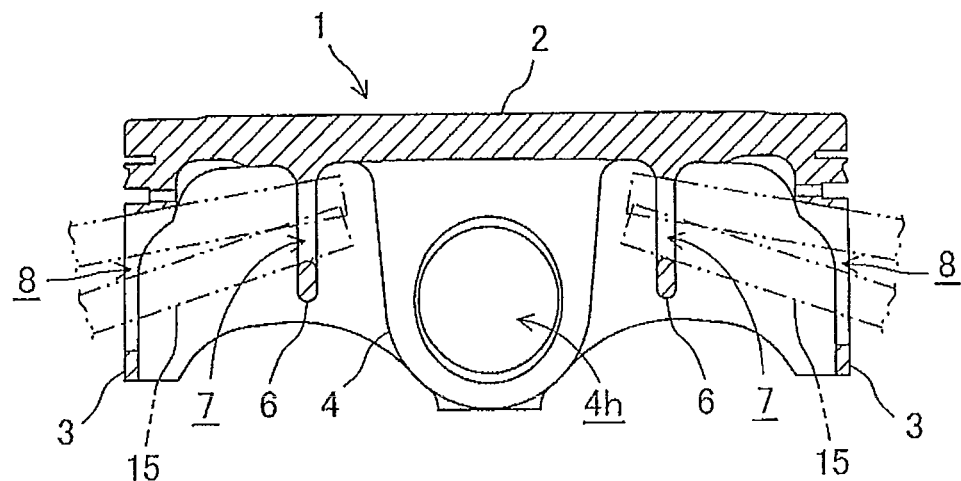
FIG. 5 is the same sectional view of the piston as the above.
Figure 6:
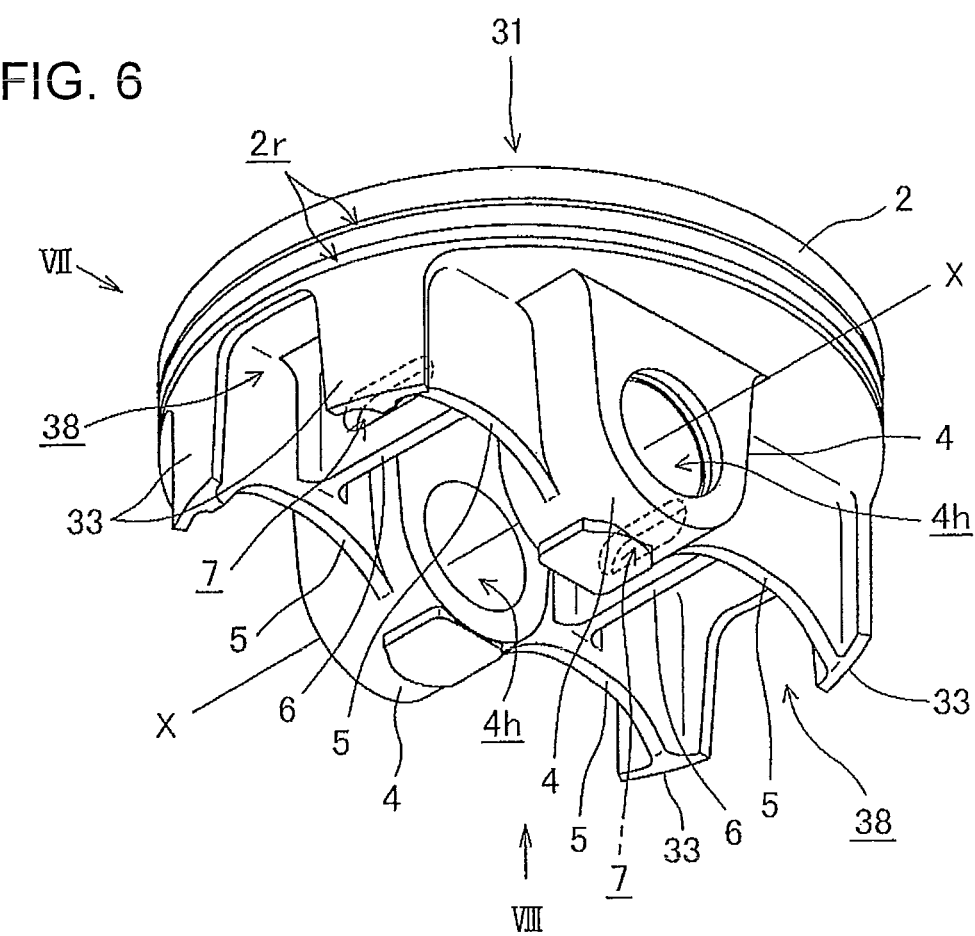
FIG. 6 is a perspective view of a piston according to another embodiment of the invention as obliquely viewed from below.
Figure 7:
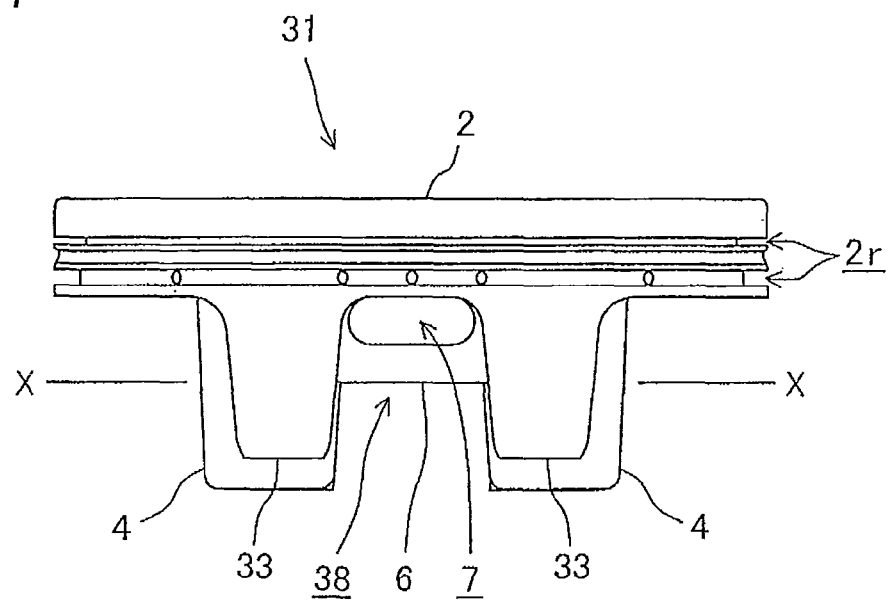
FIG. 7 is a front elevation of the piston (a view taken along the arrowed line VII in FIG. 6)
Figure 8:
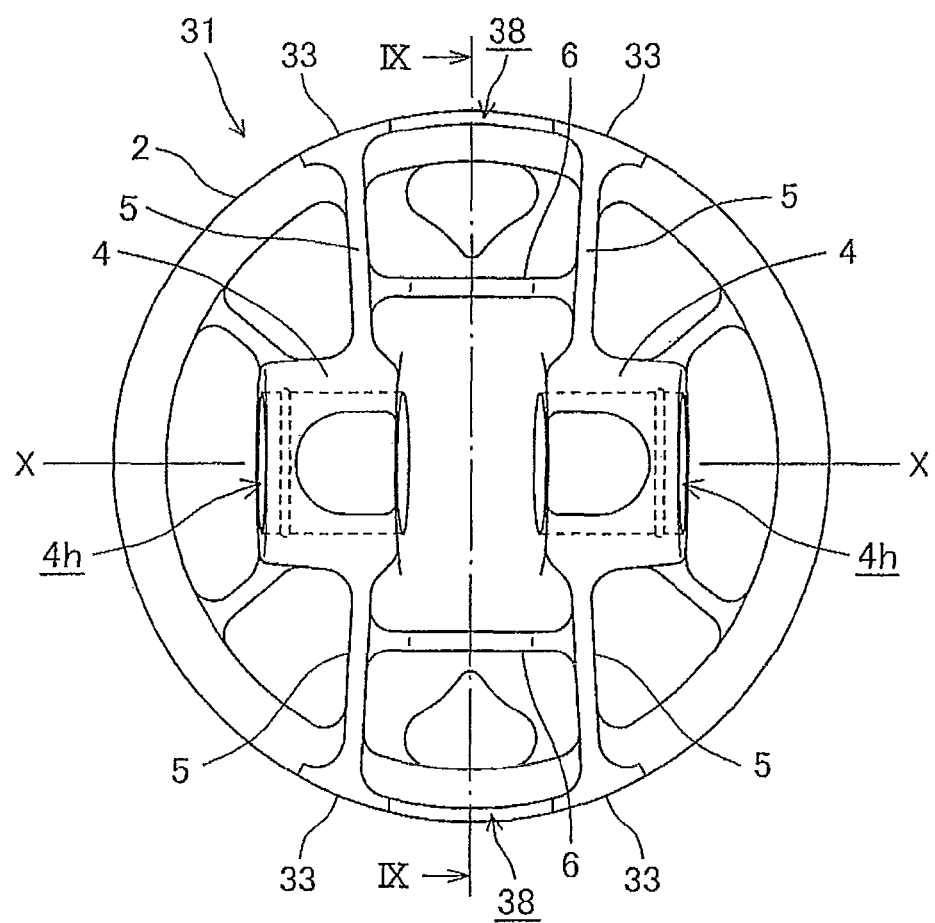
FIG. 8 is a rear view of the piston (a view taken along the arrowed line VIII in FIG. 6)
Figure 9:
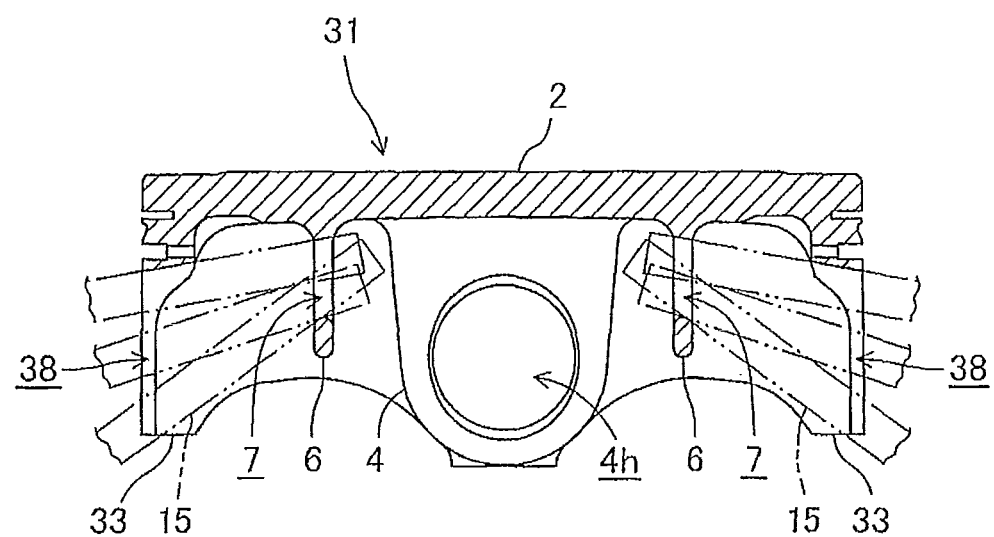
FIG. 9 is a sectional view of the piston (a sectional view taken on the line IX-IX in FIG. 8).

During the casting of the piston, the skirt openings 8 of the piston skirt portions 3 are cast simultaneously and thereafter, cutting blades 15 (represented by chain double-dashed lines in FIG. 5) is inserted from outside through the formed skirt openings 8 so as to cut the transverse-rib through holes 7 at required places of the transverse ribs 6, as shown in FIG. 5. The component members of casting dies and the number of working steps are reduced further. The transverse-rib through holes 7 can be cut easily by taking the advantage of the skirt openings 8. Thus, the number of processing steps is reduced to achieve a reduction in the manufacturing cost.

Next, a piston 31 according to a second embodiment of the invention will be described with reference to FIG. 6 to FIG. 9.

The piston 31 has substantially the same construction as the piston 1 according to the first embodiment except for the configuration of skirt openings 38 formed in piston skirt portions 33. Therefore, like reference numerals refer to the corresponding parts.

The skirt opening 38 formed in the piston skirt portion 33 of the piston 31 is a cut-away portion formed by cutting away a part of the piston skirt portion 33 from a distal end thereof. The skirt opening 38 is configured such that the piston skirt portion 3 of the piston 1 is removed of the continuously extending lower end which defines the skirt opening 8 formed by cutting the substantially rectangular hole.

The piston skirt portion 33 extends vertically downwardly as divided into two parts by the skirt opening 38 proximal to the piston head 2. As seen in the front elevation of the piston 31 shown in FIG. 7, the transverse-rib through hole 7 faces the skirt opening 38 as shifted to a place corresponding to an upper part of the skirt opening 38. The transverse-rib through hole 7 at the back of the skirt opening can be seen through the skirt opening 38.

The weight of the piston 31 is further reduced by providing in the piston skirt portions 33 the skirt openings 38 having a larger opening area whereby the piston is even further reduced in the inertial mass.

The skirt opening 38 is the cut-away portion formed by cutting away a part of the piston skirt portion 33 from the distal end thereof. When the piston 31 is cast, therefore, the skirt openings 38 can be formed without using cores so that the component members of the casting dies and the number of working steps are reduced to reduce the casting cost. The cutting blades 15 (represented by chain double-dashed lines in FIG. 9) may be inserted from outside through the formed skirt openings 38 so as to cut the transverse-rib through holes 7 at required places of the transverse ribs 6.

Since the skirt openings 38 are the cut-away portions, it is quite easy to perform the cutting work for cutting the transverse-rib through holes 7 with the cutting blades 15.

As described above, the casting of the piston 31 and the cutting of the transverse-rib through holes 7 can be performed easily so that the manufacture costs are reduced.

Just as illustrated by the foregoing embodiment shown in FIG. 4, the piston 31 is also adapted to permit the common slide cores to be inserted through the skirt openings 38 and the transverse-rib through holes 7 having the smaller opening area for casting the skirt openings 38 and the transverse-rib through holes 7 simultaneously when the piston 31 is cast. The transverse-rib through holes 7 and the skirt openings 38 can be simultaneously cast with ease to reduce the number of working steps. Thus, an increase in the manufacturing cost is reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A piston including a pair of mutually opposed longitudinal ribs individually formed with piston pin bosses for interconnecting mutually opposed piston skirt portions on a back side of a piston head, comprising:
  a pair of transverse ribs interconnect the mutually opposed longitudinal ribs;
  transverse-rib through holes being formed in the transverse ribs at places proximal to the back side of the piston head; and
  a skirt opening being formed by cutting away a part of the piston skirt portion that is opposed to the transverse rib that faces the transverse-rib through hole,
  wherein the pair of transverse ribs extend parallel to a center axis X-X of the piston pin bosses and project from a back side of the piston head.

2. The piston according to claim 1, wherein the skirt opening is a hole-shaped cut-away portion formed by cutting a hole through the piston skirt portion.

3. The piston according to claim 1, wherein the skirt opening is a cut-away portion formed by cutting away a part of the piston skirt portion from a distal end thereof.

4. The piston according to claim 1, wherein an opening area of the skirt opening is larger than or equal to an opening area of the transverse-rib through hole.

5. The piston according to claim 2, wherein an opening area of the skirt opening is larger than or equal to an opening area of the transverse-rib through hole.

6. The piston according to claim 3, wherein an opening area of the skirt opening is larger than or equal to an opening area of the transverse-rib through hole.

7. The piston according to claim 4, wherein when the piston is cast, the skirt opening and the through hole are simultaneously cast using a common slide core.

8. The piston according to claim 1, wherein the skirt opening is simultaneously cast when the piston is cast, and
wherein cutting blades are inserted from outside through the formed skirt openings for cutting the transverse-rib through holes at required places of the transverse ribs.

9. The piston according to claim 2, wherein the skirt opening is simultaneously cast when the piston is cast, and
wherein cutting blades are inserted from outside through the formed skirt openings for cutting the transverse-rib through holes at required places of the transverse ribs.

10. The piston according to claim 3, wherein the skirt opening is simultaneously cast when the piston is cast, and
wherein cutting blades are inserted from outside through the formed skirt openings for cutting the transverse-rib through holes at required places of the transverse ribs.

11. The piston according to claim 4, wherein the skirt opening is simultaneously cast when the piston is cast, and
wherein cutting blades are inserted from outside through the formed skirt openings for cutting the transverse-rib through holes at required places of the transverse ribs.

12. A piston comprising:
a pair of mutually opposed longitudinal ribs individually formed with piston pin bosses for interconnecting mutually opposed piston skirt portions on a back side of a piston head;
a pair of transverse ribs interconnect the mutually opposed longitudinal ribs;
transverse-rib through holes being formed in the transverse ribs at places proximal to the back side of the piston head; and
a skirt opening being formed by cutting away a part of the piston skirt portion that is opposed to the transverse rib that faces the transverse-rib through hole;
said skirt portion being formed adjacent to exterior portions on each side of the pair of mutually opposed longitudinal ribs, wherein the transverse-rib through holes and the skirt opening are aligned relative to each other,
wherein the pair of transverse ribs extend parallel to a center axis X-X of the piston pin bosses and protect from a back side of the piston head.

13. The piston according to claim 12, wherein the skirt opening is a hole-shaped cut-away portion formed by cutting a hole through the piston skirt portion.

14. The pistol according to claim 12, wherein the skirt opening is a cut-away portion formed by cutting away a part of the piston skirt portion from a distal end thereof.

15. The piston according to claim 12, wherein an opening area of the skirt opening is larger than or equal to an opening area of the transverse-rib through hole.

16. The piston according to claim 13, wherein an opening area of the skirt opening is larger than or equal to an opening area of the transverse-rib through hole.

17. The piston according to claim 14, wherein an opening area of the skirt opening is larger than or equal to an opening area of the transverse-rib through hole.

18. The piston according to claim 15, wherein when the piston is cast, the skirt opening and the through hole are simultaneously cast using a common slide core.

19. The piston according to claim 12, wherein the skirt opening is simultaneously cast when the piston is cast, and
wherein cutting blades are inserted from outside through the formed skirt openings for cutting the transverse-rib through holes at required places of the transverse ribs.

20. The piston according to claim 13, wherein the skirt opening is simultaneously cast when the piston is cast, and
wherein cutting blades are inserted from outside through the formed skirt openings for cutting the transverse-rib through holes at required places of the transverse ribs.

* * * * *